United States Patent [19]
Vogel et al.

[11] Patent Number: 5,996,632
[45] Date of Patent: Dec. 7, 1999

[54] PRESSURE RELIEF ADAPTER

[75] Inventors: Todd J. Vogel, Waterville; Michael P. Wells, Holland, both of Ohio

[73] Assignee: Aeroquip Corporation, Maumee, Ohio

[21] Appl. No.: 09/211,305

[22] Filed: Dec. 14, 1998

[51] Int. Cl.[6] .......................... F16L 55/04; F16K 31/363
[52] U.S. Cl. ................................ 138/31; 138/45; 138/46; 137/504
[58] Field of Search ................................ 138/31, 30, 44, 138/45, 46; 137/504

[56] References Cited

U.S. PATENT DOCUMENTS

| | | | |
|---|---|---|---|
| 912,502 | 2/1909 | Squires | 138/31 |
| 920,716 | 5/1909 | Beckman | 138/31 X |
| 1,859,400 | 5/1932 | Kersey | 181/279 |
| 2,342,355 | 2/1944 | Mercier | 138/30 |
| 2,809,666 | 10/1957 | Judd | 138/31 |
| 2,875,789 | 3/1959 | Wright | 138/31 |
| 3,015,345 | 1/1962 | Michael | 138/31 |
| 3,115,897 | 12/1963 | Sparling | 138/31 |
| 3,170,481 | 2/1965 | Presnell | 137/504 X |
| 3,503,417 | 3/1970 | Toda et al. | 137/504 X |
| 3,805,824 | 4/1974 | Robbins, Jr. | 137/504 |
| 3,893,486 | 7/1975 | Meyers | 138/31 |
| 4,066,096 | 1/1978 | Lind, Jr. | 137/504 |
| 4,117,023 | 9/1978 | Gillet et al. | 585/451 |
| 4,540,021 | 9/1985 | Rogers | 137/614.05 |
| 4,592,387 | 6/1986 | Rogers | 137/614.06 |
| 4,614,348 | 9/1986 | Fournier | 222/625 |
| 4,768,551 | 9/1988 | Allread et al. | 137/614.04 |
| 4,786,029 | 11/1988 | Laipply et al. | 251/149.6 |
| 4,962,792 | 10/1990 | Chaul | 137/504 X |
| 5,022,438 | 6/1991 | Faraon-Chaul | 137/504 X |
| 5,081,847 | 1/1992 | Anderson, Jr. | 138/44 X |
| 5,123,446 | 6/1992 | Haunhorst et al. | 137/614.02 |
| 5,170,638 | 12/1992 | Koenig et al. | 137/504 X |
| 5,181,534 | 1/1993 | Hashida et al. | 137/504 X |
| 5,210,382 | 5/1993 | Paley et al. | 138/30 X |
| 5,544,780 | 8/1996 | Jye | 220/211 |
| 5,658,324 | 8/1997 | Bailey, Sr. et al. | 607/104 |
| 5,720,684 | 2/1998 | Mott | 474/110 |
| 5,743,298 | 4/1998 | Whitesell | 138/31 |

FOREIGN PATENT DOCUMENTS

| | | |
|---|---|---|
| 3925294 A1 | 7/1989 | Germany . |
| 405106778A | 4/1993 | Japan . |
| 1229506 A1 | 5/1986 | U.S.S.R. . |
| 1622706 A1 | 1/1991 | U.S.S.R. . |

*Primary Examiner*—Patrick Brinson
*Attorney, Agent, or Firm*—Emch, Schaffer, Schaub & Porcello Co., L.P.A.

[57] ABSTRACT

A pressure relief adapter includes a body and a slideable sleeve positioned in a passageway thereof and cooperating therewith and with O-rings to define a sealed chamber containing ambient air or other gas. The slideable sleeve has an enlarged head at one end. A compression spring in the chamber urges the sleeve toward the end having the enlarged head. Upon introduction of hydraulic fluid under pressure into the passageway and sleeve, the hydraulic fluid acting on the enlarged head urges the sleeve in a direction compressing the spring and reducing the size of the chamber thereby relieving pressure in the fluid flow system in which the adapter is positioned.

14 Claims, 3 Drawing Sheets

PRESSURE RELIEF ADAPTER

DESCRIPTION

Pressure Relief Adapter

The present invention relates to an adapter for use in combination with a fluid flow system having a fixed size, for example, a hydraulic fluid flow line for directing hydraulic fluid to a cylinder. The adapter of the present invention has a self contained air chamber of variable size which permits a quick discount coupling to be connected in the system with minimal effort even though the system to which the adapter is connected is a fixed size system with a non-compressible fluid. In utilizing a quick disconnect coupling to fasten lines of a hydraulic system, a portion of the coupling is introduced into the system which is a fixed size system. The adapter of the present invention is mounted in such fixed size system and operates to compensate for insertion of a portion of the coupling into the fixed size system. As will be appreciated, movement of a portion of the coupling into the fixed size system, which is filled with a noncompressible liquid such as hydraulic fluid, is not possible without compensating for the loss of volume in the system for the space taken up by the portion of the coupling introduced therein. Under the present invention, the adapter has a body with an axially slideable sleeve positioned therein and cooperating therewith to form a chamber which contains a compressible fluid such as ambient air and is sealed from the fluid flow passageway of the adapter. As the insertion portion of the coupling moves into the fixed size fluid flow system, the sleeve of the adapter moves axially in the body to reduce the size of the chamber to thereby compensate for the space taken by the insertion portion of the coupling thereby relieving the pressure buildup. Prior to the present invention, the problem was solved by either having a bleed valve to bleed-off part of the liquid or by providing expensive balanced pressure valving.

IN THE DRAWINGS

DETAILED DESCRIPTION OF INVENTION

Figure 1:
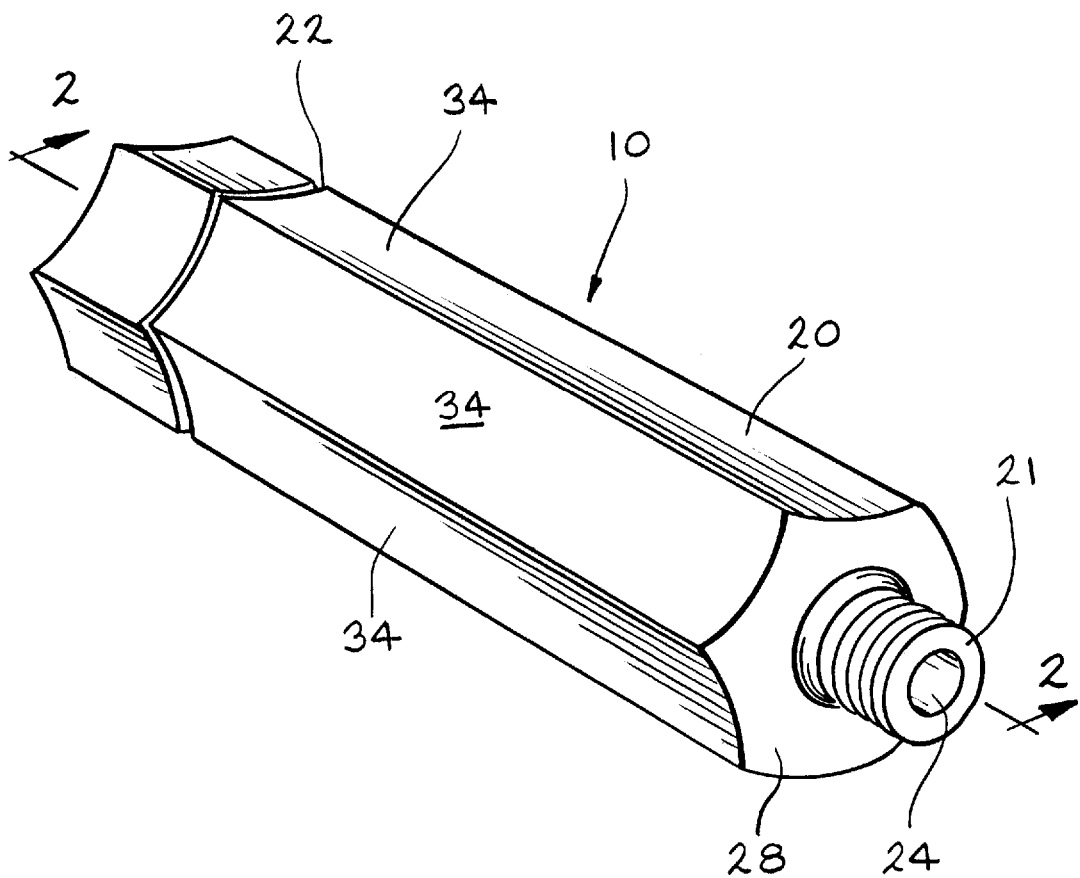
FIG. 1 is a perspective view of the adapter of the present invention.

The drawings show an adapter generally designated by the numeral 10 having a body 20 extending from a first end 21 to a second end 22 and having a passageway 24 extending along an axis A from the first end 21 to the second end 22. The body is provided with inwardly facing threads 25 spaced a short distance from the second end 22. An inwardly tapering wall surface 26 extends from the second end 22 toward the inwardly directed threads 25.

Spaced from the first end 21 is a radially outwardly extending shoulder 28. The portion of the body 20 between the shoulder 28 and the first end 21 is a connector stub 30 having outwardly facing threads 31. Between the end of the threads 31 and the shoulder 28 is an annular groove 32 for receiving an O-ring seal 33. The portion of the body between the second end 22 and the shoulder 28 has a hexagonal cross-section defining a series of flat outer wall portions 34 suitable for engagement by a wrench.

Internally, the body 20 has a first inwardly facing cylindrical wall section 35 extending from the first end 21 toward the second end 22, a second inwardly facing cylindrical wall section 36, a third inwardly facing cylindrical wall section 37, a fourth inwardly facing cylindrical wall section 38 and a fifth inwardly facing cylindrical wall section 39 which extends to the inwardly facing threads 25. The second inwardly facing wall section 36 is larger than the first inwardly facing cylindrical wall section 35 and is joined thereto by a first radial shoulder 40. The third inwardly facing cylindrical wall section 37 is larger than the second inwardly facing cylindrical wall section 36 and is joined thereto by a second radial shoulder 41. The fourth inwardly facing cylindrical wall section 38 is larger than the third inwardly facing cylindrical wall section 37 and is joined thereto by a third radial shoulder 42. The fifth inwardly facing cylindrical wall section 39 is larger than the fourth inwardly facing cylindrical wall section 38 and is joined thereto by a fourth radial shoulder 43.

Positioned in the passageway 24 of the body 20 is a pressure relief sleeve 50. The sleeve extends from a first end 51 to a second end 52 and has a cylindrical passageway 53 extending from the first end 51 to the second end 52. Preferably, the passageway 53 is the same size as the first inwardly facing cylindrical wall section 35.

Externally, the sleeve 50 has a first outwardly facing cylindrical wall portion 55 extending from the first end 51 and having a size permitting it to be received in sliding relationship with the second inwardly facing cylindrical wall section 36 of the body 20. The first outwardly facing cylindrical wall portion 55 extends to a first shoulder 56 extending radially outwardly therefrom. A second outwardly facing cylindrical wall portion 57 extends from the first shoulder 56 to a second shoulder 58. Extending axially from the second shoulder 58 is a short step 59. An enlarged radial shoulder 60 extends outwardly from the step 59 to a third outwardly facing cylindrical wall portion 61 which extends to the second end 52. The third outwardly facing cylindrical wall portion 61 is sized to be slidingly engaged with the fifth inwardly facing cylindrical wall section 39 of the body 20. It has an outwardly facing annular groove 62 in which is positioned (1) an O-ring 63 providing sealing engagement between the bottom of the groove 62 and the fifth inwardly facing cylindrical wall section 39 and (2) a rigid back-up ring 64.

Figure 2:
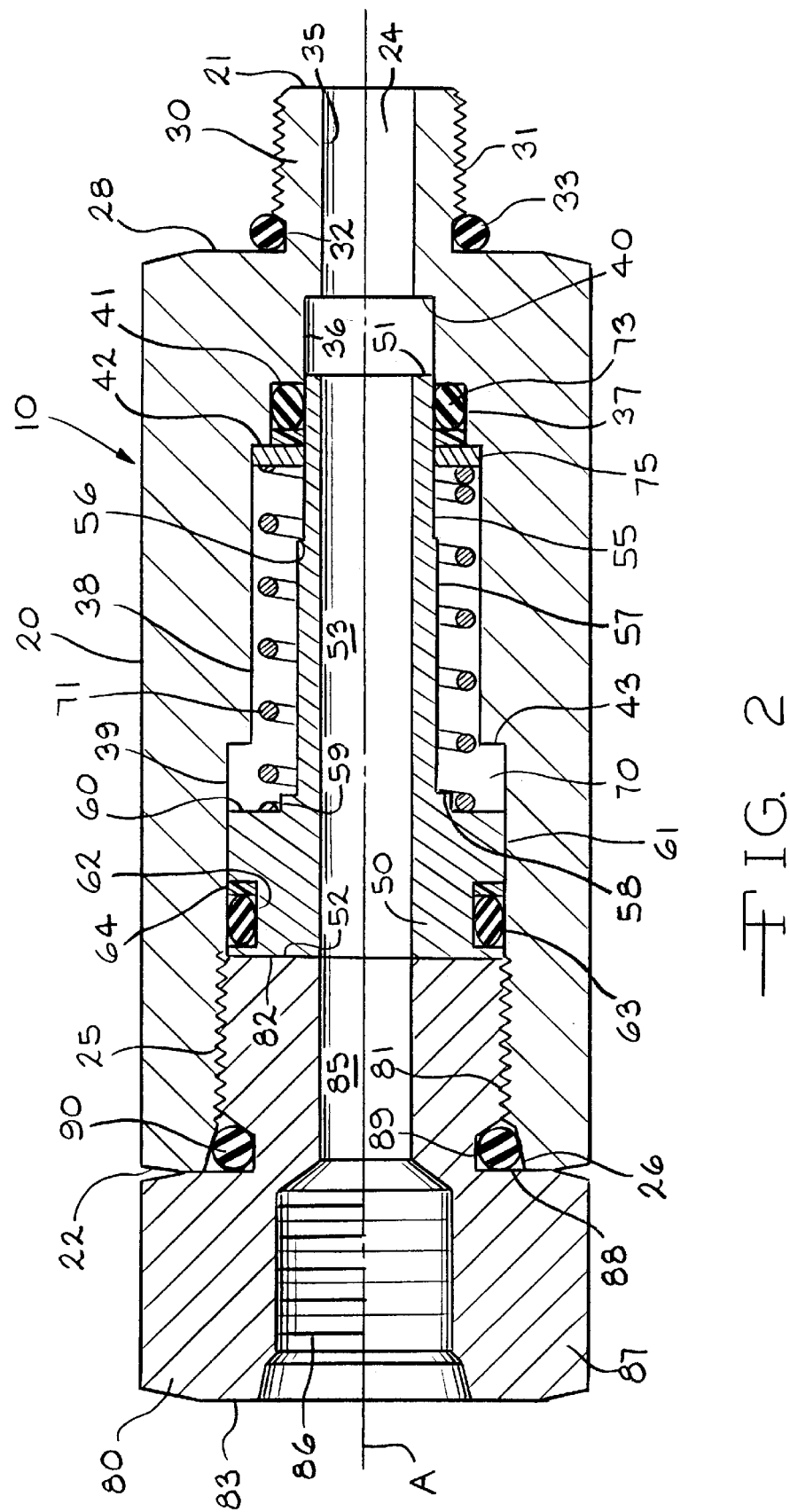
FIG. 2 is a sectional view of the adapter showing the components in a non-pressurized position.
Figure 3:
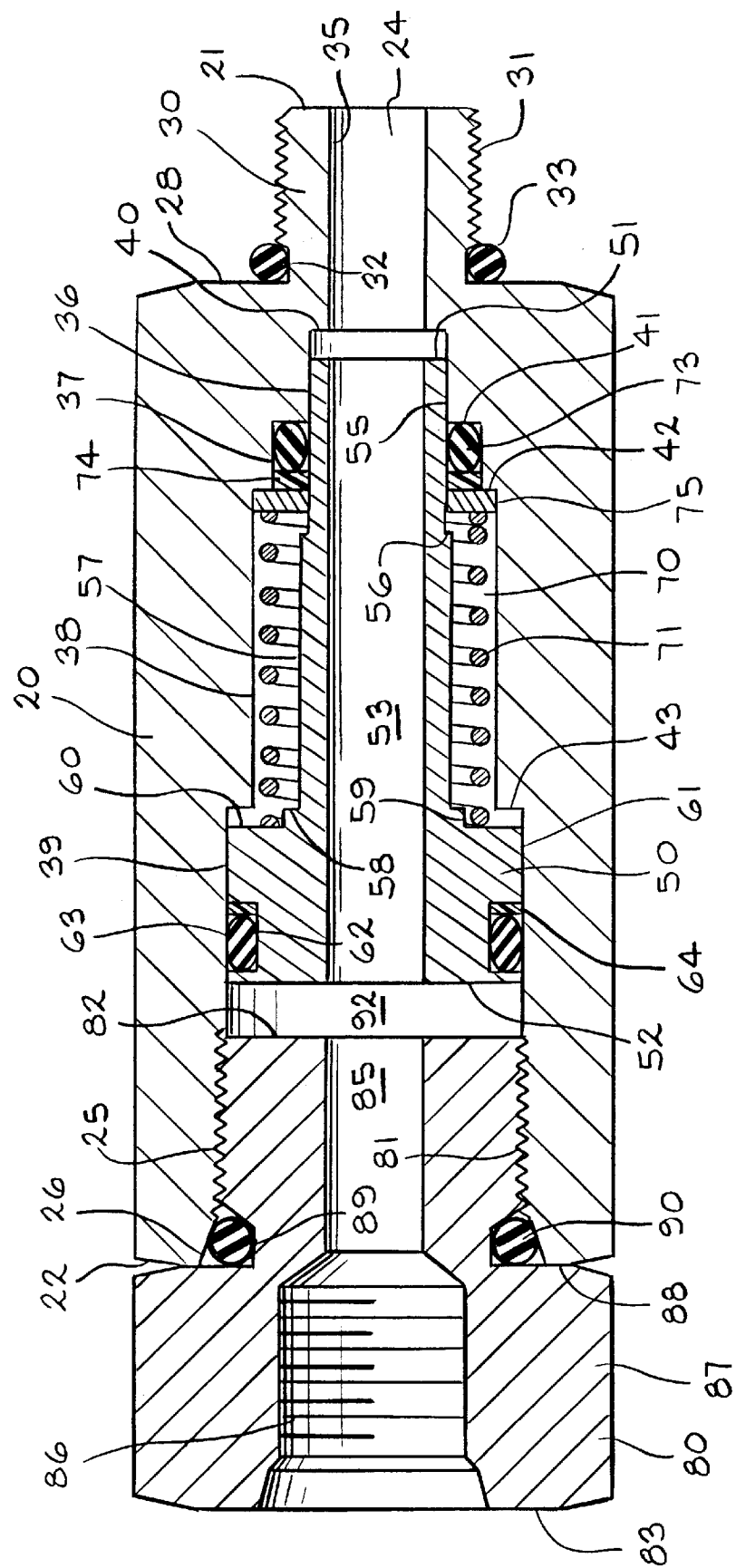
FIG. 3 is a view similar to FIG. 2 showing the position of the components after being subjected to pressure.

As can be seen from FIGS. 2 and 3, the first outwardly cylindrical wall portion 55 and second outwardly facing cylindrical wall portion 57 of the sleeve 50 are maintained in spaced relationship with the fourth inwardly facing cylindrical wall section 38 to provide a chamber 70 in which is positioned a compression spring 71. A second O-ring 73 is positioned in the corner defined by the third inwardly facing cylindrical wall section 37 and the second radial shoulder 41 of the body 20 and provides sealing engagement between those members and the first outwardly facing cylindrical wall portion 55 of the sleeve 50 thereby sealing the chamber 70. A semi-rigid back-up ring 74 is sized to fit within the third inwardly facing cylindrical wall section 37 and provides a rigid back-up for the O-ring 73. The back-up ring 74 encircles the first outwardly facing cylindrical wall portion 55 of the sleeve. An enlarged support ring 75 also encircles the first outwardly facing cylindrical wall portion 55 and is sized to rest upon the third radial shoulder 42. The spring 71 has one end against the enlarged radial shoulder 60 and the opposing end against the enlarged support ring 75 and serves to yieldingly urge the sleeve 50 away from the second radial shoulder 41 and support ring 75 to maximize the size of the chamber 70. Since the chamber 70 is sealed by the O-rings 63 and 73, liquid in the passageway 24 is prevented from reaching the chamber 70. The chamber 70 contains a compressible fluid such as ambient air or nitrogen.

If desired, a vent passage (not shown) may be provided in the body 20 to vent the chamber 70 to the atmosphere.

A plug 80 having outwardly facing threads 81 is threadedly engaged to the inwardly facing threads 25 of the body. The plug 80 extends from a first end 82 engaged to the second end 52 of the sleeve 50 when the sleeve 50 is at its maximum extended position to the left as viewed in FIG. 2 to a second end 83 outwardly of the body 20. The plug 80 has a central passageway 85 extending along the axis A which, in the area adjacent the first end 82 is substantially the same size as the cylindrical passageway 53 of the sleeve. The plug 80 is also provided with an enlarged head 87 having a radial shoulder 88 for engagement with the second end 22 of the body 20 and with internal threads 86 for attachment to a threaded connector end of the fluid flow system to which the adaptor 10 is to be connected. In the area between the outwardly facing threads 81 and the shoulder 88, the plug 80 is provided with an annular groove 89 in which is positioned an O-ring seal 90.

In operation, upon connection of a coupling to a fixed size fluid flow system, such as an hydraulic fluid flow system for example, to which the adapter 10 is connected, hydraulic fluid will be in the passageway 24, the passageway 53 of the sleeve 50 and the passageway 85 of the plug 80. As a portion of the coupling enters the fixed size system with non-compressible fluid contained therein, it will cause a build-up of pressure, which pressure will cause the hydraulic fluid to flow between the abutting sleeve 50 second end 52 and plug 80 first end 82. As a result of the fact that the second end 52 of the sleeve 50 has a larger size than the first end 51, the pressure of the hydraulic fluid acting on such second end 52 will be greater than the pressure acting on the first end 51 and will result in the hydraulic fluid urging the sleeve 50 toward the first end 21 of the body 20 as shown in FIG. 3 and reducing the size of the chamber 70. Such reduction in size of the chamber 70 compresses the ambient air contained therein. The pressure generated by the hydraulic fluid under pressure acting on the second end 52 of the sleeve 50 is sufficient to overcome the combined forces of (1) pressure of the compressed ambient air and (2) the compression spring 71. The reduction is size of the chamber 70 increases the size of the fluid flow system by the size of the gap 92 (see FIG. 3) between the second end 52 of the sleeve 50 and first end 82 of the plug 80. This is sufficient to relieve the pressure and permit ease of connection of the coupling.

Although the present invention has been described primarily with reference to utilization of the adapter to relieve pressure or prevent the build-up of additional pressure upon connection of a coupling to a pressurized fluid flow system where a portion of such coupling enters the system as it is connected thereto, it also has the advantage, when coupled as part of the system, of being able to relieve pressure resulting from thermal expansion of the fluid contained in the system. This is particularly advantageous in an hydraulic system utilizing noncompressible hydraulic oil. As will be appreciated, as the temperature of oil in the system increases, the volume of such oil will increase as a result of thermal expansion. The movement of the sleeve within the body from the increased pressure of the oil acting of the second end 52 of the sleeve 50 will relieve such pressure.

Modifications will become readily apparent to those skilled in the art. Accordingly, the scope of the present invention should be determined only by the scope of the claims.

We claim:

1. A pressure relief adapter comprising
   (a) a body extending along an axis from a first end to a second end and having a first inwardly facing wall section and a second inwardly facing wall section, said second inwardly facing wall section having a larger size than said first inwardly facing wall section;
   (b) a sleeve positioned for axial movement in said body, said sleeve having a first portion in sliding engagement with said body first inwardly facing wall section, and a second portion in sliding engagement with said body second inwardly facing wall section, said second portion having an end with a cross-sectional size larger than said first portion, said sleeve cooperating with said body to define a chamber; and
   (c) a spring yieldingly urging said sleeve in an axial direction toward said second portion end;
   said body and said sleeve defining a fluid flow passage for receiving pressurized fluid, said pressurized fluid acting upon said sleeve second portion end to move said sleeve axially toward said first inwardly facing wall section to reduce the size of said chamber; and
   (d) seals cooperating with said sleeve and said body to prevent pressurized fluid flowing through said fluid flow passage from reaching said chamber.

2. A pressure relief adapter according to claim 1 further including a first annular seal between said body and said sleeve first portion and a second annular seal between said second inwardly facing cylindrical wall section and said sleeve second portion.

3. A pressure relief adapter according to claim 1 wherein said body has a third inwardly facing wall section positioned axially between said first and second inwardly facing wall sections, said third inwardly facing wall section having a cross-sectional size larger than said first inwardly facing wall section and smaller than said second inwardly facing wall section, at least a portion of said sleeve being axially aligned with said third inwardly facing wall section.

4. A pressure relief adapter according to claim 3 further including a first body shoulder between said body first and third inwardly facing wall sections and a sleeve shoulder between said sleeve first and second portions, said spring having a first end retained in a fixed axial position by said first body shoulder and a second end yieldingly urgeable against said sleeve shoulder.

5. A pressure relief adapter according to claim 4 further including a washer encircling said sleeve positioned between said first body shoulder and said spring first end.

6. A pressure relief adapter comprising
   (a) a body extending along an axis from a first end to a second end and having a first inwardly facing wall section, a second inwardly facing wall section, said second inwardly facing wall section having a larger size than said first inwardly facing wall section, a third inwardly facing wall section positioned axially between said first and second inwardly facing wall sections, said third inwardly facing wall section having a cross-sectional size larger than said first inwardly facing wall section and smaller than said second inwardly facing wall section, at least a portion of said sleeve being axially aligned with said third inwardly facing wall section, a first body shoulder between said body first and third inwardly facing wall sections, a fourth inwardly facing wall section positioned axially between said first and third inwardly facing wall sections, said fourth inwardly facing wall section having a cross-sectional size larger than said first inwardly facing wall section and smaller than said third inwardly facing wall section, a second body shoulder between said body first and fourth inwardly facing wall sections, (b) a sleeve positioned for axial movement in said body, said sleeve having a first portion in sliding engagement with said body first inwardly facing wall section, and a second portion in sliding engagement with said body second inwardly facing wall section, said second portion having an end with a cross-sectional size larger than said first portion, and a sleeve shoulder between said sleeve first and second portions, at least a portion of said sleeve being axially aligned with said third inwardly facing wall section, said sleeve cooperating with said body to define a chamber;

c) a spring yieldingly urging said sleeve in an axial direction toward said second portion end, said spring having a first end retained in a fixed axial position by said first body shoulder and a second end yieldingly urgeable against said sleeve shoulder;

(d) a first O-ring sealingly engaging said body fourth inwardly facing wall section and said sleeve first portion, and (e) a second O-ring sealingly engaging said body second inwardly facing wall section and said sleeve second portion;

said body first inwardly facing wall section and said sleeve defining a fluid flow passage for receiving pressurized fluid, said pressurized fluid acting upon said sleeve second portion end to move said sleeve axially toward said first inwardly facing wall section to reduce the size of said chamber.

7. A pressure relief adapter according to claim 6 further including a washer encircling said sleeve positioned between said first body shoulder and said spring first end.

8. A pressure relieve adapter according to claim 1 further including a plug engaged to said body second end, said plug having an engagement surface positioned to be engaged by said sleeve second portion end.

9. A pressure relief adapter according to claim 8 wherein said body has a sealing surface extending from said second end and tapering inwardly toward said axis and further including an O-ring sealingly engaging said sealing surface and said plug.

10. A pressure relief adapter comprising (a) a body having a passageway extending along an axis from a first end to a second end, said passageway permitting the flow of fluid under pressure;

(b) a sleeve positioned in said passageway, said sleeve having a channel for receiving fluid under pressure entering said passageway at said first end and discharging it toward said second end, said sleeve being axially movable in said passageway and cooperating with said body to define a chamber, said sleeve having a small end and an opposing end of larger size than said small end;

(c) a spring yieldingly urging said sleeve in a direction away from said body first end; and (d) first and second axially spaced apart seals between said body and said sleeve, said seals cooperating with said sleeve to prevent fluid flowing through said passageway and said channel from reaching said chamber;

said fluid under pressure acting on said opposing end to move said sleeve against the biasing action of said spring to reduce the size of said chamber.

11. A pressure relief adapter according to claim 10 wherein said body passageway and said sleeve channel cooperate to define a first volume when said sleeve is at its maximum distance away from said first end and to define a second, smaller volume when said sleeve is positioned closer to said first end.

12. A method for relieving pressure in a pressurized fluid flow system comprising the steps of affixing an adapter to said system, said adapter having a passageway permitting the entry and exit of fluid under pressure from said system, said adapter having a variable size chamber containing a compressible fluid, said chamber being sealed from said passageway to prevent the entry therein of fluid flowing through said fluid flow system, and reducing the size of said chamber in response to an increase in pressure of pressurized fluid in said passageway, said reduction in size of said chamber causing an increase in size of said fluid flow system.

13. A method for relieving pressure according to claim 12 wherein said variable size chamber is defined by a cooperating body member and a sleeve positioned therein, said sleeve being axially movable in said passageway and further including the step of causing said pressurized fluid to move said sleeve in said body to reduce the size of said chamber.

14. A pressure relief adapter (a) a body extending along an axis from a first end to a second end and having an inwardly facing wall;

(b) a sleeve positioned for axial movement in said body, said sleeve having a first portion spaced from said body inwardly facing wall, and a second portion in sliding engagement with said body inwardly facing wall, said second portion having an end with a cross-sectional size larger than said first portion, said sleeve cooperating with said body to define a chamber;

(c) a first seal between said sleeve first portion and said body and a second seal between said sleeve second portion and said body; and (d) a spring yieldingly urging said sleeve in an axial direction toward said second portion end;

said body and said sleeve defining a fluid flow passage for receiving pressurized fluid, said pressurized fluid acting upon said sleeve second portion end to move said sleeve axially toward said spring to reduce the size of said chamber, said seals and said sleeve cooperating to prevent pressurized fluid flowing through said fluid flow passage from reaching said chamber.

* * * * *